Oct. 23, 1951     T. W. SARGE ET AL     2,572,669
MEANS FOR CONTROLLING THE DISSIPATION OF NORMALLY
SOLID, VOLATILE ORGANIC INSECTICIDES
Filed Oct. 20, 1948
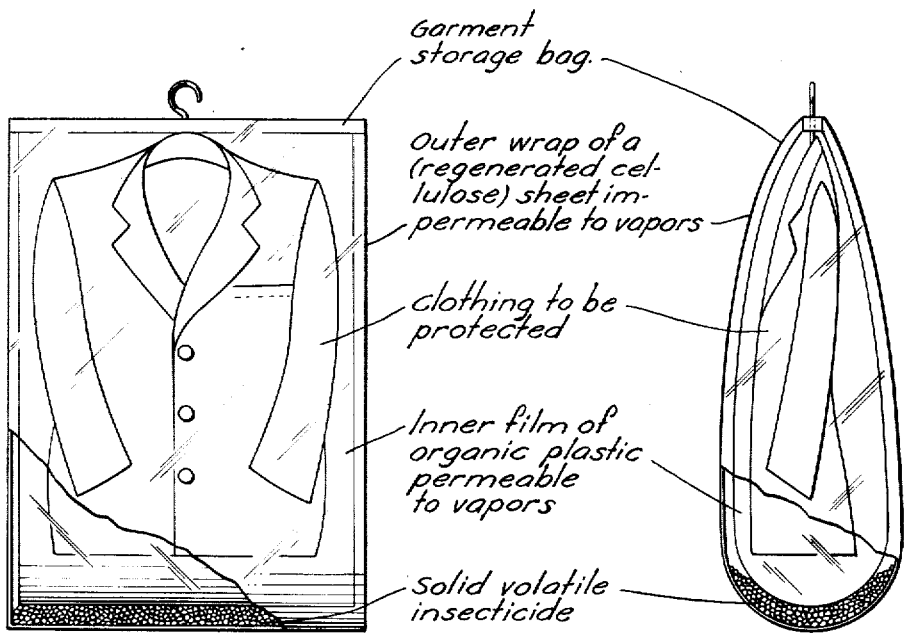
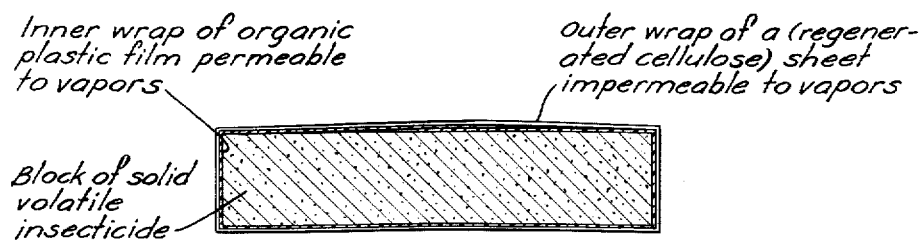
INVENTORS.
Theodore W. Sarge
BY Hugo L. Schaefer
Griswold & Burdick
ATTORNEYS

Patented Oct. 23, 1951

2,572,669

UNITED STATES PATENT OFFICE 2,572,669

MEANS FOR CONTROLLING THE DISSIPATION OF NORMALLY SOLID, VOLATILE ORGANIC INSECTICIDES

Theodore W. Sarge and Hugo L. Schaefer, Midland, Mich., assignors to The Dow Chemical Company, Midland, Mich., a corporation of Delaware Application October 20, 1948, Serial No. 55,642

1 Claim. (Cl. 21—108)

This invention relates to a means for controlling the dissipation, during storage and use, of normally solid, volatile organic moth repellents and insecticides. It relates as well to means for controllably exposing clothing and other woolen or fur articles to the action of volatile insecticides without bringing the articles into physical contact with the solid phase of the insecticide.

Some normally solid, volatile insecticides, such as paradichlorobenzene, have been sold in granular or cake form, wrapped in regenerated cellulose sheeting to prevent volatilization until time of intended use. When the material is to be used, the cellulose sheet is removed from the insecticide, and the latter is commonly placed in or near the wool clothing to be protected. There is no means of controlling the rate of volatilization after the regenerated cellulose is removed and, especially in storage spaces in which air circulation is maintained, the volatile insecticide is soon dissipated. Another common practice is to place crystals, granules, balls or other particles of normally solid, volatile organic insecticides in the pockets or folds of clothing to be stored. When such articles are removed from storage, it is necessary to clean them thoroughly to remove remaining particles of the insecticide from the pockets and folds.

It would be preferable, and it is the object of this invention to provide means for controlling the release of vapors from normally solid, volatile organic insecticides and for preventing contact between the solid insecticide and the articles being protected. Another object is to provide a means for protecting clothing and other woolens and furs from insect attack, through the use of normally solid, volatile insecticides, without contact between the solid insecticide and the article being protected. A related object is to provide a means for confining the effect of a normally volatile, solid organic insecticide to a desired space and controlling the rate of release of the vapors of the insecticide to that space. A specific object is to provide a garment bag for the storage of articles susceptible to insect attack, which bag is capable of controlling the release of paradichlorobenzene and similar insecticide vapors to the enclosed articles while preventing the loss of such vapors to the surrounding atmosphere. Other and related objects may appear hereinafter.

We have found that, while vapors of the common, normally solid, volatile organic insecticides at room temperature are practically incapable of permeating a film of regenerated cellulose, they pass comparatively readily through the commercially available continuous films of such plastics as polyethylene, rubber hydrochloride, polyvinyl chloride, vinyl chloride-vinyl acetate copolymers, vinylidene chloride copolymers with vinyl chloride or acrylonitrile or ethyl acrylate, ethyl cellulose, cellulose acetate, and the like. According to the present invention, loss of vapors of the normally solid, volatile organic insecticides may be prevented by separating the insecticide from the atmosphere by a film of regenerated cellulose, and the evaporation of the insecticide may be controlled while at the same time preventing contact between the solid form thereof and the articles to be protected, by interposing between said solid insecticide and said articles a film of an organic thermoplastic which is permeable to the said vapors.

In a simple embodiment, the invention comprises a body of the insecticide having an inner wrap of one of the thermoplastic films and an overwrap of regenerated cellulose, the latter being left on during shipment and removed when it is desired to liberate the insecticide vapors slowly into a space containing articles to be protected.

In another embodiment, the invention comprises a double-wall garment bag or container, having regenerated cellulose outer walls exposed to the atmosphere and organic thermoplastic inner walls facing the materials to be protected, with the normally solid, volatile organic insecticide placed between the two walls. In use, this structure is most practical, as the regenerated cellulose outer sheath prevents the insecticide from being dissipated to the surrounding atmosphere and keeps the typical odor thereof from permeating the surrounding room or closet, while the inner, thermoplastic sheath, adjacent the clothing or other articles in the bag, permits an effective and equilibrium concentration of the insecticide vapors to be delivered through the plastic film into the internal bag, protecting the contents against the common destructive insects without permitting contact between the contents and the solid insecticide crystals.

The invention may be understood by reference to the accompanying drawing wherein Fig. 1 is a front elevation, in partial section, of the above-described double-wall garment bag;

Fig. 2 is a side elevation, in partial section, of the same bag, shown as though unnaturally distended to illustrate clearly the essential parts; and Fig. 3 is a vertical section through a body of volatile solid insecticide having an inner wrap of an organic plastic film permeable to the insecticide vapors and an overwrap of regenerated cellulose or other sheet impermeable to such vapors.

The following table illustrates the rates of permeation of paradichlorobenzene vapors through a variety of films at 25° and 50° C. In making the reported determinations, crystalline paradichlorobenzene was weighed into a metal cup, the test film was bound over the open top of the cup, the assembly was kept at the noted constant temperature for 200 hours, and the loss in weight was determined and computed in terms of grams per 100 square inches of film per day.

TABLE I

| Film Material | Thickness, Inches | Permeation Rate, grams/100 sq. in./24 hours | |
|---|---|---|---|
| | | at 25° C. | at 50° C. |
| Regenerated cellulose (moistureproof). | .0013 | (¹) | 0.24 |
| Ethyl cellulose | .0010 | 6.1 | 49.0 |
| Cellulose acetate | .0010 | 2.1 | 31.7 |
| Polyvinyl chloride-acetate (85:15) | .0040 | 8.1 | 41.9 |
| Polyethylene | .0040 | | 30.6 |
| Do | .0020 | 2.67 | 36.8 |
| Do | .0010 | 3.56 | 47.2 |
| Rubber hydrochloride | .0012 | 1.66 | 29.6 |
| Do | .0017 | 2.06 | 31.2 |
| Vinylidenechloride-vinylchloride (85:15). | .0010 | 0.34 | 18.3 |

¹ nil 200 hrs.

The results reported above are surprising in view of the common presumption that regenerated cellulose and "plastic" films are generally impervious to the passage of vapors in any significant quantity. This assumption holds true for moistureproof regenerated cellulose and the listed plastic films in their behavior toward the relatively small water molecule, but it is here seen that large organic molecules pass through all of the films except regenerated cellulose with relative freedom.

The utility of the invention is illustrated by the following examples, in which two of the common, normally solid, volatile insecticides are shown to be liberated as vapor through a film of one of the least permeable of the plastics listed above, in amounts which are shown to be lethal to two common wool-destroying insects.

*Example 1*

A weighed charge of paradichlorobenzene, or of carbon tetrabromide, which had been screened through a 10-mesh screen and retained on a 14-mesh screen, was sealed in each of several bags 4.5 inches square made of a film 0.5 mil thick composed of the copolymer made from a monomeric mixture of 85 per cent vinylidene chloride and 15 per cent vinyl chloride. A similar, weighed charge of paradichlorobenzene was placed on an open petri dish. The test chambers were metal containers of 24.5 liters capacity in which were placed either one of the sealed film bags or the open petri dish and screen cages of the test insects. The insects were the confused four beetle (*Tribolium confusum*), referred to in the following tables as T. c., and the black carpet beetle (*Attagenus piceus*), referred to in the same tables as A. p. The tests were continued for the periods of time noted in the tables, and the mortality among the test insects was noted.

TABLE II

| Type of Container | Initial charge of Insecticide, grams | Insecticide | Insect | Exposure Period, hours | Mortality, Per cent |
|---|---|---|---|---|---|
| Petri dish | 4 | C₆H₄Cl₂ | T. c. | 72 | 100 |
| Do | 4 | do | A. p. | 72 | 66 |
| Sealed bag | 4 | do | T. c. | 72 | 100 |
| Do | 4 | do | A. p. | 72 | 48 |
| Do | 4 | do | T. c. | 144 | 100 |
| Do | 4 | do | A. p. | 144 | 100 |
| Do | 4 | CBr₄ | T. c. | 144 | 100 |
| Do | 4 | do | A. p. | 144 | 40 |

The 4 gram load corresponds to the dosage of 10 pounds per 1000 cubic feet recommended by the U. S. Department of Agriculture.

*Example 2*

In a similar manner, larger amounts of insecticide were sealed in larger and smaller bags made from the same film, and were tested for their ability to control the same wool-destroying insects. The results appear in the following table.

TABLE III

| Size of film bag, inches | Charge of paradichlorobenzene, grams | Insect | Exposure Period, hours | Mortality, per cent |
|---|---|---|---|---|
| 3¼ x 4¼ | 119 | T. c. | 144 | 100 |
| 3¼ x 4½ | 119 | A. p. | 144 | 100 |
| 12 x 12 | 20 | T. c. | 72 | 100 |
| 12 x 12 | 20 | A. p. | 72 | 100 |

In each case, less than a gram of the insecticide had evaporated in the test period.

It is apparent that the amount of the insecticide which vaporizes through the plastic film is somewhat proportional to the exposed area of film, and that, because of the rate of release of vapors through such films, a larger charge of insecticide may be justified than when the crystals are open to the atmosphere in the storage space.

*Example 3*

A clothes storage bag is made 2 feet wide, 5 feet long and capable of expanding to 6 inches deep. The bag is of two-ply construction, the inner wall being made of a film 1 mil thick of the copolymer of vinyl chloride with about 17 per cent vinyl acetate, and the outer layer being made of a sheet of moistureproof regenerated cellulose, also about 1 mil thick. Four ounces (equivalent to about 40 pounds per 1000 cubic feet) of crystalline paradichlorobenzene are placed between the two walls of the bag, and wool winter clothing is hung inside the plastic bag. The open upper end of the bag is clamped shut and the assembly is hung in a clothes closet through the summer months. No odor of the insecticide is noticeable in the closet. No insect attack occurs in the so-stored wool clothes. Most of the crystalline paradichlorobenzene remains between the walls of the bag at the end of the storage period, and the bag may be put aside for use another season without a further charge of the insecticide. Only the clothes stored in the bag acquire the odor of the insecticide, and this is removed before using the clothes by the customary airing procedure.

Example 4

Paradichlorobenzene, carbon tetrabromide, naphthalene or other normally solid, volatile organic insecticide or moth repellent is packed for sale in convenient small quantities in one of the plastic films suggested above. This package is given an outer wrap of regenerated cellulose sheet. No loss in weight and no noticeable escape of odor occurs during shipment and storage of the so-packed insecticide. When some of the material is to be relied on for its insecticidal or insectifugal action, the outer wrap of regenerated cellulose is removed and the plastic-film-enclosed agent is placed in the closet, chest, bureau drawer, or other space to be protected, or is put in pockets or folds of the clothing. None of the solid insecticide comes into actual contact with the clothing, which is protected as effectively in this manner as in the more conventional one involving such contact.

We claim:

As an article of manufacture, a double-wall clothes bag, the outer wall being of regenerated cellulose sheet, the inner walls being of an organic thermoplastic film whereof the thermoplastic is selected from the group consisting of polyethylene, rubber hydrochloride, polyvinyl chloride, vinyl chloride-vinyl acetate copolymer, vinylidene chloride-vinyl chloride copolymer, vinylidene chloride-ethyl acrylate copolymer, ethyl cellulose and cellulose acetate, and having a body of a normally solid, volatile organic insecticide selected from the group consisting of paradichlorobenzene, carbon tetrabromide and naphthalene between said inner and outer walls.

THEODORE W. SARGE.
HUGO L. SCHAEFER.

REFERENCES CITED

The following references are of record in the file of this patent:

UNITED STATES PATENTS

| Number | Name | Date |
| --- | --- | --- |
| 1,133,018 | Freid | Mar. 23, 1915 |
| 1,479,704 | Duddleson | Jan. 1, 1924 |
| 1,726,573 | Lang | Sept. 3, 1929 |
| 1,817,530 | Spanel | Aug. 4, 1931 |
| 1,924,324 | Kondolf | Aug. 29, 1933 |
| 2,184,600 | Knup et al. | Dec. 26, 1939 |
| 2,281,760 | Glaskowsky | May 5, 1942 |
| 2,428,861 | Waring et al. | Oct. 14, 1947 |
| 2,431,924 | Dunaway | Dec. 2, 1947 |
| 2,452,957 | Sabin | Nov. 2, 1948 |

FOREIGN PATENTS

| Number | Country | Date |
| --- | --- | --- |
| 340,343 | Great Britain | Jan. 1, 1931 |

Certificate of Correction

Patent No. 2,572,669 October 23, 1951

THEODORE W. SARGE ET AL.

It is hereby certified that error appears in the printed specification of the above numbered patent requiring correction as follows:

Column 5, line 29, after "copolymer," insert *vinylidene chloride-acrylonitrile copolymer,*; column 6, line 1, strike out "idene chloride-ethyl acrylate copolymer, ethyl";

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*